(12) United States Patent
Renon

(10) Patent No.: US 9,581,039 B2
(45) Date of Patent: Feb. 28, 2017

(54) FIBER PREFORM FOR A TURBINE RING SECTOR, AND ITS METHOD OF FABRICATION

(75) Inventor: Guillaume Jean-Claude Robert Renon, Vaux Le Penil (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 1152 days.

(21) Appl. No.: 13/582,072

(22) PCT Filed: Mar. 1, 2011

(86) PCT No.: PCT/FR2011/050428
§ 371 (c)(1),
(2), (4) Date: Jan. 11, 2013

(87) PCT Pub. No.: WO2011/107708
PCT Pub. Date: Sep. 9, 2011

(65) Prior Publication Data
US 2013/0108417 A1 May 2, 2013

(30) Foreign Application Priority Data

Mar. 2, 2010 (FR) ...................... 10 51494

(51) Int. Cl.
*F01D 11/08* (2006.01)
*D03D 23/00* (2006.01)
(Continued)

(52) U.S. Cl.
CPC .............. *F01D 11/08* (2013.01); *B29B 11/16* (2013.01); *B29C 70/24* (2013.01); *D03D 11/02* (2013.01);
(Continued)

(58) Field of Classification Search
CPC ......... B23P 15/008; B23P 15/02; B23P 15/04; B23P 2700/13; B23P 19/04; F01D 11/001;
(Continued)

(56) References Cited

U.S. PATENT DOCUMENTS 3,102,559 A     9/1963  Koppelman et al.
3,481,427 A  * 12/1969  Dobbs ..................... F02K 1/827
                                                      181/292
(Continued)

FOREIGN PATENT DOCUMENTS

JP    2003-514182 A    4/2003
JP    2004-36443 A     2/2004
(Continued)

OTHER PUBLICATIONS

International Search Report Issued May 20, 2011 in PCT/FR11/50428 Filed Mar. 1, 2011.

*Primary Examiner* — Jennifer Chriss
*Assistant Examiner* — Frank Vineis
(74) *Attorney, Agent, or Firm* — Oblon, McClelland, Maier & Neustadt, L.L.P.

(57) ABSTRACT

A fiber preform for a turbine ring sector obtained by three-dimensional weaving and including a base-forming first portion, two tab-forming L-shaped portions each presenting two branches, two ends of the first portion being extended by respective ones of the first branches, and a second portion connecting together the two tabs, first and second strips woven together forming the first branches, a first fraction of the thicknesses of the second branches, and the first portion, there being a non-linked zone between them that is situated in the first branches and in the first portion, and a third (Continued)

woven strip forming the second portion and a second fraction of the thickness of the second branches of each of the tabs.

8 Claims, 2 Drawing Sheets

(51) Int. Cl.

| | | |
|---|---|---|
| *B29C 70/24* | (2006.01) | |
| *D03D 11/02* | (2006.01) | |
| *B29B 11/16* | (2006.01) | |
| *D03D 25/00* | (2006.01) | |
| *B29L 31/00* | (2006.01) | |

(52) U.S. Cl.
CPC ............ *D03D 23/00* (2013.01); *D03D 25/005* (2013.01); *B29L 2031/7504* (2013.01); *D10B 2505/02* (2013.01); *Y10T 29/49323* (2015.01)

(58) Field of Classification Search
CPC .... F01D 11/005; F01D 11/006; F01D 11/008; F01D 11/02; F01D 11/08; F01D 11/14; F01D 11/16; F01D 11/18; F01D 11/22; F01D 11/24; F01D 11/12; F01D 11/127; F01D 11/122; F01D 11/20; F01D 5/02; F01D 5/225; F01D 25/246; F01D 25/285; F01D 9/00; F01D 9/02; F01D 9/04; F01D 9/042; F01D 9/044; F02C 7/04; F02C 7/20; F05D 2230/60; F05D 2240/10; F05D 2240/12; F05D 2240/56; F05D 2260/30; F05D 2230/00; F04D 29/08; F04D 29/10; F04D 29/16; F04D 29/2266; F04D 29/266; F04D 29/263; F04D 29/2222; F04D 2240/11; F16J 15/164; F16J 15/32; F16J 15/3284; F16J 15/3288; F16J 15/447; F16J 15/4476; F16J 15/4472; F23R 3/60; Y10T 29/49323; Y10T 442/3211; Y10T 442/3203; Y10T 442/3195; D03D 23/00; D03D 25/005; D03D 11/00; D03D 11/02; B29C 70/24; B29C 70/222; B29C 11/16; B29L 2031/7504; D10B 2505/02
USPC ............ 29/889.22; 415/170.1, 171.1, 172.1, 415/173.1, 173.2, 173.3, 173.4, 173.5, 415/173.6, 173.7, 174.1, 174.2, 174.3, 415/174.4, 174.5; 442/205–207

See application file for complete search history.

(56) References Cited

U.S. PATENT DOCUMENTS

| | | |
|---|---|---|
| 3,943,980 A | 3/1976 | Rheaume |
| 4,686,134 A | 8/1987 | Ono |
| 4,922,968 A | 5/1990 | Bottger et al. |
| 6,575,697 B1 | 6/2003 | Arilla et al. |
| 6,932,566 B2 | 8/2005 | Suzumura et al. |
| 7,147,432 B2 | 12/2006 | Lowe et al. |
| 8,348,602 B2 | 1/2013 | Botrel et al. |
| 2007/0007386 A1 | 1/2007 | Coupe et al. |
| 2010/0144227 A1 | 6/2010 | Coupe et al. |
| 2011/0005632 A1 | 1/2011 | Bertolani |
| 2012/0027572 A1* | 2/2012 | Denece .................. F01D 9/04 415/127 |

FOREIGN PATENT DOCUMENTS

| | | |
|---|---|---|
| JP | 2005-9429 A | 1/2005 |
| JP | 2005-155626 A | 6/2005 |
| JP | 2007-45393 A | 2/2007 |
| JP | 2008-111441 A | 5/2008 |
| WO | 2009 100737 | 8/2009 |

\* cited by examiner

FIBER PREFORM FOR A TURBINE RING SECTOR, AND ITS METHOD OF FABRICATION

BACKGROUND OF THE INVENTION

Field of the Invention

The invention relates to a fiber preform for a turbine sector, to its method of fabrication, to a turbine ring sector incorporating such a fiber preform, and to a turbine ring assembly comprising a plurality of such ring sectors.

The field of application of the invention is particularly that of gas turbine aeroengines. Nevertheless, the invention is applicable to other types of turbomachinery, e.g. industrial turbines.

Description of the Related Art

Ceramic matrix composite (CMC) materials are known for their good mechanical properties that make them suitable for constituting structural elements, and for their ability to conserve their properties at high temperatures.

In gas turbine aeroengines, improving efficiency and reducing polluting emissions has lead to a search for operation at ever-higher temperatures.

Thus, the use of CMCs for the various hot parts of such engines has already been envisaged, particularly since CMCs are of lower density than the metallic materials conventionally used.

Thus, turbine ring sectors have already been made as a single piece of CMC with a structure of the kind shown in FIG. 1.

FIG. 1 shows a high pressure turbine ring assembly comprising a CMC turbine ring 10 and a metal ring-support structure 13. The turbine ring 10 surrounds a set of rotary blades 15. The turbine ring 10 is made up of a plurality of ring sectors 100, FIG. 1 being a meridian section view on a plane passing between two contiguous ring sectors.

Each ring sector 100 has a section that is substantially in the shape of an upside-down Greek letter pi (π) with a base 112 in the form of a ring segment and an inside face coated in a layer 113 of abradable material defining the flow passage for the gas stream in the turbine. Tabs 114 and 116 extend from the outside face of the base 112. One of the tabs, the upstream tab 114, presents a meridian section that is substantially in the form of a letter L on its side and it extends upstream so as to co-operate with the upstream end of the base 112 to define a U-shaped portion defining a housing 115 extending over the depth of the upstream end portion 114a. The other tab 116, or downstream tab, presents a meridian section that is substantially in the shape of a letter T on one side and it extends downstream from the downstream end of the base 112.

The terms "upstream" and "downstream" are used herein with reference to the flow direction of the gas stream through the turbine (arrow F in FIG. 1).

The ring support structure 13, which is secured to the turbine casing 30, comprises an annular upstream radial flange 32 carrying a hook 34 of annular shape with a comma-shaped meridian section pointing downstream in the axial direction, and suitable for engaging in the housing 115. The way the end portion 34a of the hook 34 engages in the housing 115 is designed so as to provide sealing between the gas stream flow passage and the outside of the ring sectors 100, on their upstream end.

On the downstream end, the ring support structure 13 includes an annular flange 36 of upside-down L-shape terminated by an annular bearing portion 36a against which the annular end portion 116a of the tab 116 bears. The end portion 116a of the tab 116 and the bearing portion 36a of the flange 36 are held pressed against each other without clearance by means of a clamp 38 having a meridian section in the shape of a letter U on its side, forming a spring clip in conventional manner. The clamp 38 is held stationary in circumferential manner relative to the flange 36 and the tab 116 by being inserted between fingers 36b and 116b that project downstream from the portion 36a of the flange 36 and from the end portion 116a of the tab 116.

In order to provide the best possible sealing between the gas flow passage through the turbine and the outside of the turbine at its downstream end, a gasket 20 is compressed between the bearing portion 36a of the flange 36 and the end portion 116a of the tab 116. By way of example, the gasket 20 is constituted by a metal braid held in a housing formed in the inside face of the bearing portion 36a.

In addition, inter-sector sealing is provided by sealing tongues 22 housed in each ring sector 100, inside the base 112, in its middle portion and over almost the entire upstream to downstream length of the base 112.

Ring sectors 100 as described above need to present significant thickness so that the portions made of CMC surrounding the sealing tongue and also constituting the two tabs 114 and 116 are strong enough to withstand the thermomechanical stresses to which they are subjected in operation.

BRIEF SUMMARY OF THE INVENTION

An object of the present invention is to provide a novel turbine ring sector structure that makes it possible in particular to reduce the weight of ring sectors still further.

To this end, the present invention provides a fiber preform for a turbine ring sector, the preform being obtained by three-dimensional weaving and comprising a base-forming first portion, two tab-forming L-shaped portions each presenting a first branch and a second branch, two ends of the first portion being extended by respective ones of said first branches, and a second portion connecting together the two tabs by a first connection formed between the second portion and one of the two tabs and a second connection formed between the second portion and the other of the two tabs, said second portion co-operating with the tabs and the first portion to define a cavity, first and second strips that are woven together forming the first branches, a first fraction of the thicknesses of the second branches, and the first portion, there being a non-linked zone between them that is situated in the first branches and in the first portion, and a third woven strip forming the second portion and a second fraction of the thickness of the second branches of each of the tabs.

In this way, it can be understood that by making such a structure, and in particular by having a cavity that is defined by the first portion in an inward direction, the second portion in an outward direction, and at its upstream and downstream ends by the first branches of the two tabs, a structure is obtained that is hollow and thus lighter in weight than a structure that is solid.

In this way, it is possible to use a minimum thickness for the CMC without harming and reducing the mechanical strength properties of the ring sectors.

Preferably, one or more of the following provisions is/are implemented:

the location of at least one of the first and second connections formed between the second portion (i.e.

the third strip) and the two tabs is situated substantially between the corresponding first branch and second branch;

at least one of the first and second connections formed between the second portion (i.e. the third strip) and the two tabs is the result of the assembly formed by the first and second strips and also the third strip;

at least one of the first and second connections formed between the second portion (i.e. the third strip) and the two tabs is formed by stitching; and the second branch of each tab is formed by superposing a fraction of the assembly formed by the first and second strips and a fraction of the third strip.

BRIEF DESCRIPTION OF THE SEVERAL VIEWS OF THE DRAWINGS

Other advantages and characteristics of the invention appear on reading the following description made by way of example and with reference to the accompanying drawings, in which.

DETAILED DESCRIPTION OF THE INVENTION

Each ring sector of the invention is made of CMC by forming a fiber preform 40 (see FIG. 2) of a shape close to that of the ring sector, and by densifying the ring sector with a ceramic matrix.

In order to make the fiber preform 40, it is possible to use yarns made of ceramic fibers, e.g. yarns of SiC fiber such as those sold by the Japanese supplier Nippon Carbon under the name "Nicalon", or else yarns made of carbon fibers.

This fiber preform 40 comes from a blank that is made by three-dimensional weaving, or multilayer weaving, with zones of non-interlinking being arranged in order to space apart portions of the preform that receive the metal strips forming the sealing tongues.

In the embodiment of FIGS. 2 to 8, three strips A, B, and C are woven simultaneously using mutually parallel warp yarns that extend from upstream to downstream.

Figure 2:
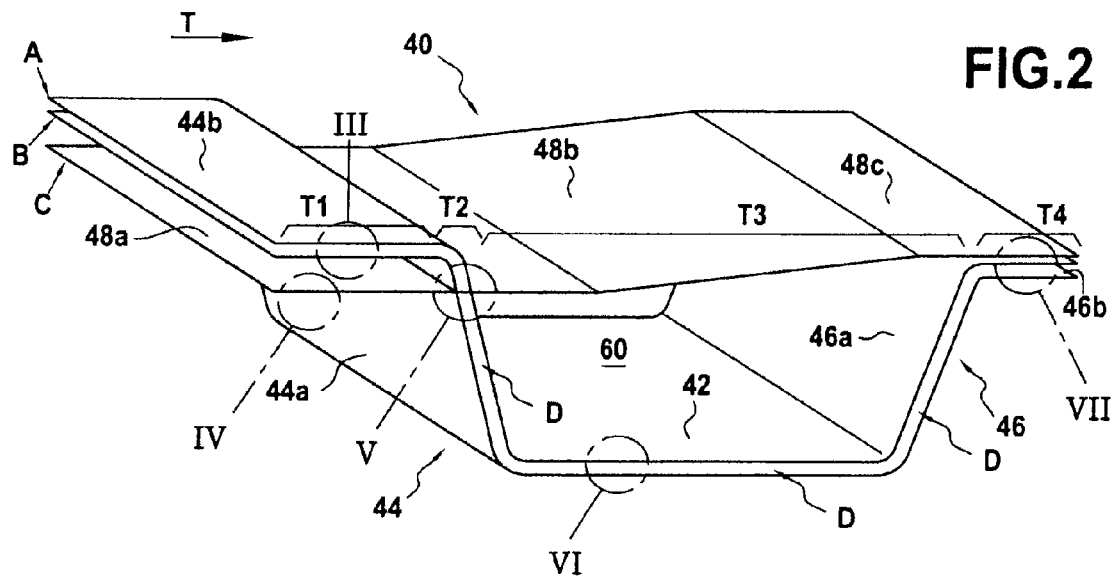
FIG. 2 is a perspective view of a fiber preform of the invention.

The terms "upstream" and "downstream" are used herein relative to the direction in which weaving advances (arrow T in FIG. 2).

Figure 3:
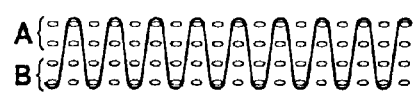
FIGS. 3 to 7 are enlarged views of the weaving planes of zones III to VII in FIG. 2.
Figure 4:
Figure 5:
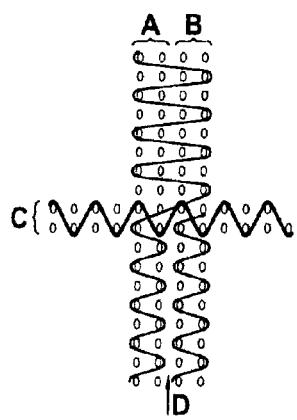
Figure 6:
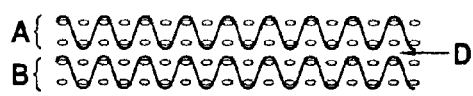
Figure 7:
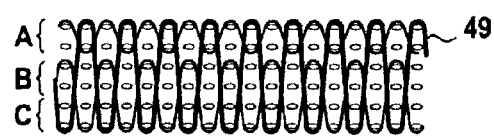

The first strip A and the second strip B are woven together using common weft yarns that pass through the entire thickness of the assembly formed by the first strip A and the second strip B, so as to connect together all of the layers of warp yarns, with this taking place in a first segment T1 and also in a fourth segment T4 of the preform 40 (see FIGS. 2, 3, and 7).

In a second segment T2 constituting a transition segment of the preform 40 (see FIGS. 2 and 5), the assembly formed by the first strip A and the second strip B crosses through the third strip C.

In a third segment T3 of the preform 40 (see FIGS. 2, 5, and 6), the first strip A and the second strip B are woven simultaneously with independent weft yarns for each of the strips A and B, such that a gap is left between the first strip A and the second strip B, thereby constituting a zone D of non-interlinking.

The third strip C of the preform 40 (see FIGS. 2, 4, and 7) is woven parallel to the assembly formed by the first strip A and the second strip B in a manner that is separate and independent, apart from within the transition second segment T2 of the preform 40: at that location the warp yarns of the assembly formed by the first strip A and the second strip B cross the warp yarns of the third strip C. The weft yarns of the third strip C remain attached thereto, while the weft yarns of the assembly formed by the first strip A and the second strip B link together all of the layers of warp yarns in the assembly formed by the first strip A and the second strip B before the above-mentioned crossing (on top in FIG. 5) and are then separated, after the above-mentioned crossing, so that some of the weft yarns connect together all of the layers of warp yarns in the first strip A and other weft yarns connect together all of the layers of warp yarns of the second strip B (to the bottom of FIG. 5, which corresponds to the beginning of the third segment T3).

For the third strip C, going from upstream to downstream, there are defined a first segment 48a arranged facing the first segment T1 of the preform 40, a second segment 48b arranged facing the third segment T3 of the preform 40, and a third segment 48c arranged facing the fourth segment T4 of the preform 40.

Thus, in the transition second segment T2, weaving provides linking between all three strips A, B, and C, thereby securing them to one another and making it possible to obtain a preform blank as a single piece at the end of the weaving step.

FIGS. 3 to 7 are warp sections (orthogonal to the direction T in FIG. 2) showing examples of successive weave planes respectively for weaving detail zones III to VII in FIG. 2.

In the example shown, the total number of layers of warp yarns is two in each of the strips A, B, and C.

Naturally, that number could be other than two, in particular it could be greater than two.

Furthermore, it is possible to use numbers of warp yarns that in the three strips A, B, and C that are not all identical.

Because of the shape given to the preform 40, as can be seen in FIG. 2, it can be understood that the third strip C is shorter than the assembly formed by the first strip A and the second strip B, since the third strip C remains practically horizontal, while the assembly formed by the first strip A and the second strip B presents, after the preform 40 has been put into shape (see FIG. 2), a cross-section shape similar to a yogurt pot, i.e. a U-shape with vertical branches that flare slightly and with free ends that are extended by respective horizontal arms.

The weaving may be of the interlock type, as shown.

Other three-dimensional or multilayer weaves may be used, e.g. multi-plane or multi-satin weaves. Reference may be made to document WO 2006/136755.

After weaving, the blank may be shaped so as to obtain the ring sector preform 40 without cutting any yarns, and in particular without cutting any warp yarns.

After this shaping, a preform 40 is obtained having the shape that is shown in FIG. 2 that defines the various ring sector portions that are to result therefrom:

a first portion 42 or base, having an inside facet that is to form the inside face of the ring, resulting from a central portion of the third segment T3 of the assembly formed by the first strip A and the second strip B, and defining a first fraction of the non-interlinked zone D;

two tabs 44 and 46 in the form of L-shaped portions presenting respective first branches 44a (46a) extending the ends of the first portion 42, and second branches 44b (46b) extending the first branches 44a (46a) and being parallel to the first portion 42. The first branches 44a and 46a correspond to the two end portions of the third segment T3 of the assembly formed by the first strip A and the second strip B, and respectively they define second and third fractions of the non-interlinked zone D. The second branch 44b of the upstream tab 44, facing the first segment T1 of the preform 40 results from superposing an upstream end segment of the assembly formed by the first strip A and the second strip B (on top) and an upstream end segment 48a of the third strip C (underneath). The second branch 46b of the downstream tab 46, facing the fourth segment T4 of the preform 40, results from superposing a downstream end segment of the assembly formed by the first strip A and the second strip B (underneath) and a downstream end segment 48c of the third strip C (on top); and a second portion 48b forming an outside wall and connecting together the two tabs 44 and 46, at a distance from and parallel to the first portion 42.

To this end, a first connection between the second portion 48b and the upstream tab 44 is made by the crossing described above and results from the weaving of the three strips A, B, and C. This serves to connect together the third strip C forming the second portion 48b and one of the two tabs (upstream tab 44).

Furthermore, the second connection between the second portion 48b and the downstream tab 46 is embodied by a connection between the third strip C and the assembly formed by the first and second strips A and B at the other tab (downstream tab 46).

Said second connection is preferably made by stitching (see FIGS. 2 and 7): a stitching yarn 49 passes through the entire thickness of all three strips A, B, and C in the downstream tab 46, thereby providing means that are simple and fast for fixing the structure of the preform 40. The stitching yarn 49 also serves to close the cavity 60 defined between the first branch 46 of the downstream tab, the first portion 42, the first branch 44a of the upstream tab 44, and the second portion 48b.

Thus, in the invention, a method is performed of fabricating a fiber preform 40 that is to form a turbine ring sector constituted by a single piece of ceramic matrix composite material comprising a first portion 42 forming a base and with two ends each extended by an L-shaped portion forming a tab (upstream portion 44, downstream portion 46), presenting both a first branch (44a, 46a) and a second branch (44b, 46b), and a second portion 48b connecting together the two tabs 44 and 46 and suitable for co-operating with the tabs 44 and 46 and with the first portion 42 to define a cavity 60, the method preferably comprising the following steps:
  simultaneously weaving a first strip A, a second strip B, and a third strip C;
  the first strip A and the second strip B being woven parallel to each other so as to form the first portion 42, the first branches (44a, 46a) of the tabs (44, 46) and first portions of the thicknesses of the second branches (44b, 46b) of the tabs (44, 46), the first strip A and the second strip B being linked together so as to form an assembly in the second branches (44b, 46b), and forming between them a non-interlinked zone D at the locations of the first portion 42 and the first branches (44a, 46a) of the tabs (44, 46);

weaving the third strip C so that said third strip C crosses the assembly formed by the first strip A and the second strip B at one of the tabs (the upstream tab 44), so as to connect the third strip C forming the second portion 48b with one of the two tabs (upstream tab 44a); and
  connecting the third strip C to the assembly formed by the first strip A and the second strip B at the other tab (downstream tab 46a). In the example shown, this connection is obtained by stitching the yarn 49 all along the second branch 46b of the downstream tab 46.

Figure 8:
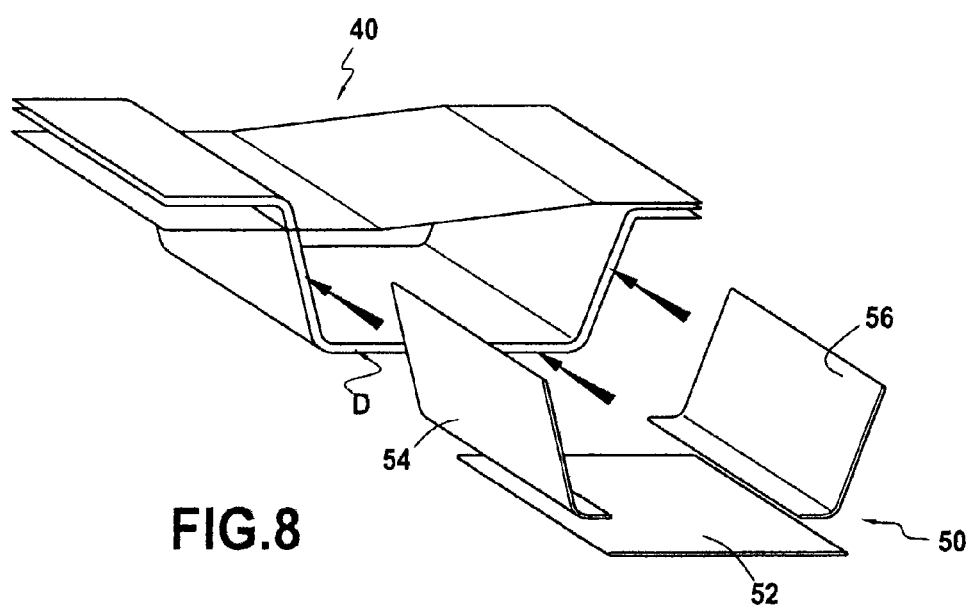
FIG. 8 is a view similar to that of FIG. 2 showing how metal strips of the turbine ring sector are put into place.

Thereafter, provision is made for the method also to include an additional step in which metal strips 50 are put into place in said non-interlinked zone D (see FIG. 8).

These metal strips 50 are preferably in the form of three strips comprising:
  a first flat strip 52 that is housed horizontally in the first fraction of the non-interlinked zone D situated facing the first portion 42;
  a second strip 54 of L-shape having a long branch that is placed in the second fraction of the non-interlinked zone D situated facing the first branch 44a of the upstream tab 44, and a short branch covering the upstream edge of the first strip 52; and
  a third strip 56 of back-to-front L-shape with a long branch placed in the third fraction of the non-interlinked zone D situated facing the first branch 46a of the downstream tab 46, and a short branch covering the downstream edge of the first strip 52.

Alternatively, it is possible to use only the first strip 52, or else only the first strip 52 together with the second strip 54.

Thereafter, in order to obtain ring sectors, it is necessary to perform conventional subsequent steps of forming a CMC, i.e. in particular with a fiber preform made of SiC fiber:
  treating the preform 40 so as to eliminate the size from the fibers;
  forming a thin layer of an interphase coating on the fibers of the preform by chemical vapor infiltration (CVI);
  impregnating the fibers with a consolidation composition, typically a resin, possibly diluted in a solvent;
  drying the preform;
  cutting the preform to length;
  shaping the preform by placing it in a shaping mold;
  curing and then pyrolyzing the resin;
  optionally forming a second interphase layer;
  densifying the preform 40 with a ceramic matrix, e.g. an SiC matrix; and
  depositing a layer of abradable coating on the inside face (facing away from the cavity 60) of the first portion 42.

This produces a turbine ring sector as a single piece of ceramic matrix composite material made up of a preform 40 as described above and of metal strips 52, 54, and 56 arranged in the non-interlinked zone D situated between the first strip A and the second strip B at the location of the first portion 42 and of the first branches 44a, 46a of the upstream and downstream tabs 44 and 46.

Figure 1:
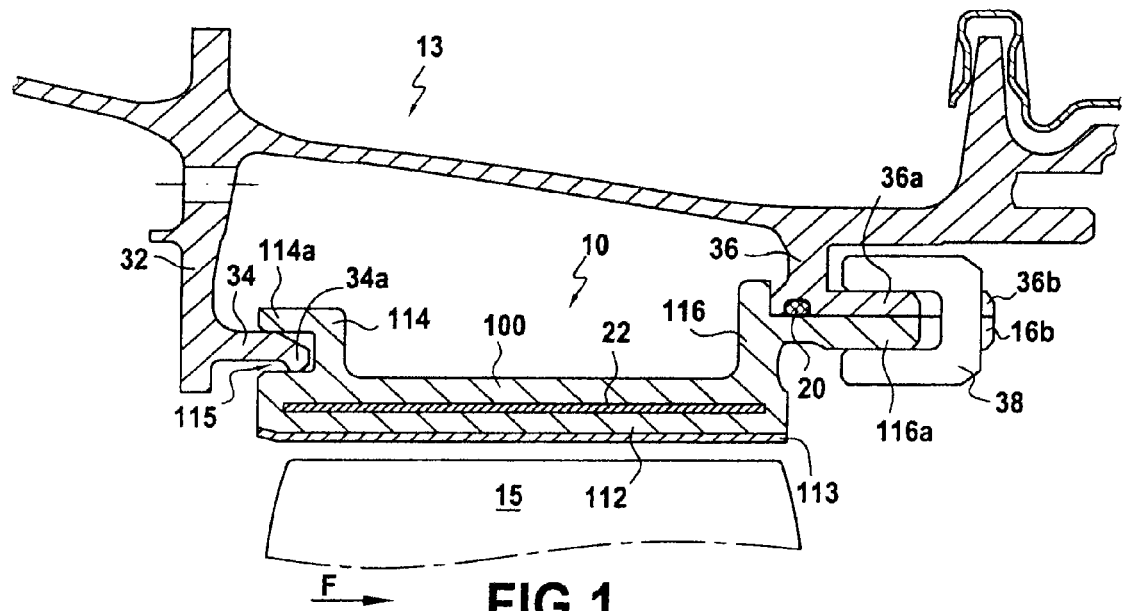
FIG. 1, described above, is a view in meridian half-section showing a prior art turbine ring assembly.

A ring sector obtained from such a preform 40 is mounted in a manner similar to that shown in FIG. 1. More precisely:
  the second branch 46b of the downstream tab 46 is housed in the clamp 38 bearing against the annular bearing portion 36a of the annular flange; and
  the second branch 44b of the upstream tab 44 is housed in a hook that is placed in the same location as the hook 34 of FIG. 1 but that presents a U-shape that is open in the downstream direction.

In this way, a turbine ring assembly is made up of a plurality of ring sectors as described above and a ring support structure. Under such circumstances, the first portions 42 of the fiber preform 40 constitute an annular inside wall, the second portions 48b of the fiber preform 40 constitute an annular outside wall, and the ends of the second branches 44b, 46b of the two tabs 44, 46 are engaged in housings in the ring support structure.

The invention claimed is:

1. A fiber preform for a turbine ring sector, the preform being obtained by three-dimensional weaving and comprising:
    a base-forming first portion;
    two tab-forming L-shaped portions forming tabs each presenting a first branch and a second branch, two ends of the first portion being extended by respective ones of the first branches, and a second portion connecting together the two tabs by a first connection formed between the second portion and one of the two tabs and a second connection formed between the second portion and the other of the two tabs, the second portion co-operating with the tabs and the first portion to define a cavity; and
    first and second strips that are woven together forming the first branches, a first fraction of the thicknesses of the second branches, and the first portion, there being a non-interlinked zone between the first and second strips, the non-interlinked zone being situated in the first branches and in the first portion, and a third woven strip forming the second portion and a second fraction of the thickness of the second branches of each of the tabs,
    wherein, in the non-interlinked zone, the first strip and the second strip are woven with independent weft yarns for each of the first and second strips.

2. A fiber preform according to claim 1, wherein at least one of the first and second connections formed between the second portion and the two tabs is situated substantially between the corresponding first branch and second branch.

3. A fiber preform according to claim 1, wherein at least one of the first and second connections formed between the second portion and the two tabs is a result of an assembly formed by the first and second strips and the third strip.

4. A fiber preform according to claim 1, wherein at least one of the first and second connections formed between the second portion and the two tabs is formed by stitching.

5. A fiber preform according to claim 1, wherein the second branch of each tab is formed by superposing a fraction of the assembly formed by the first and second strips and a fraction of the third strip.

6. A single-piece turbine ring sector made of ceramic matrix composite material formed by a preform according to claim 1 and metal strips arranged in the non-interlinked zone situated between the first strip and the second strip in the locations of the first portion and the first branches of the tabs.

7. A turbine ring assembly comprising:
    a plurality of ring sectors according to claim 6; and
    a ring support structure,
    wherein the first fiber preform portions constitute an annular inner wall, the second fiber preform portions constitute an annular outer wall, and the ends of the second branches of the two tabs are engaged in respective housings of the ring support structure.

8. A single-piece turbine ring sector made of ceramic matrix composite material comprising a preform according to claim 1.

* * * * *